Aug. 9, 1960
K. F. BACON
2,948,852
SYSTEMS FOR DETECTING RELATIVE MOVEMENTS
USING FERRO-RESONANT SYSTEMS
Filed April 10, 1958
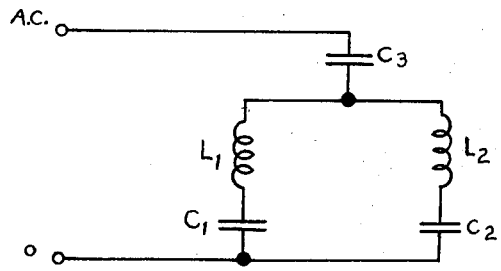
FIG.1
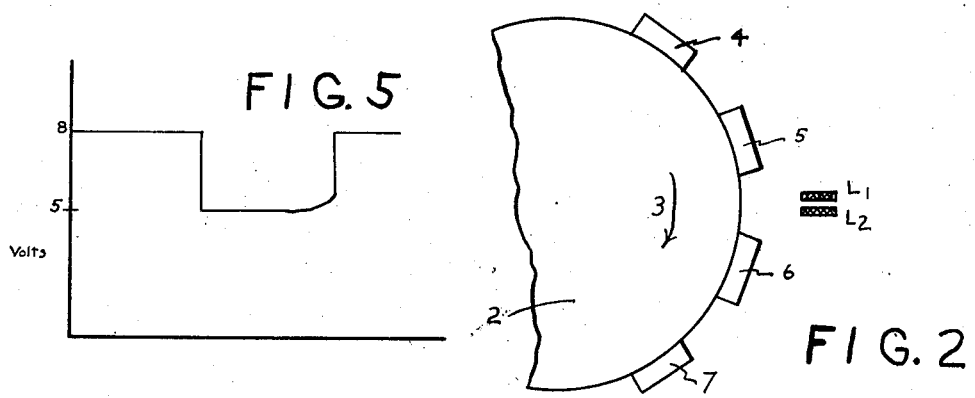
FIG.5
FIG.2
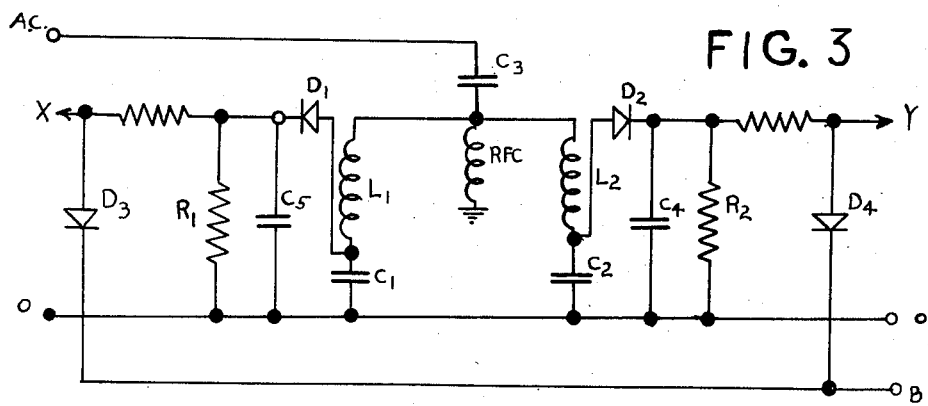
FIG.3
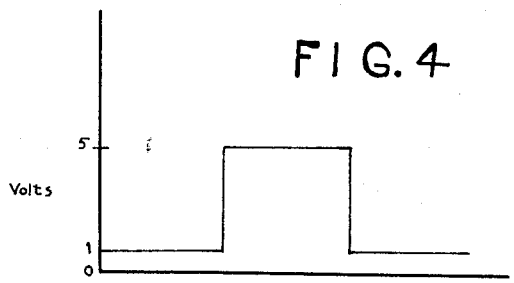
FIG.4
INVENTOR.
KENNETH F. BACON
BY
*Frank R. Trifari*
AGENT 2,948,852

SYSTEMS FOR DETECTING RELATIVE MOVEMENTS USING FERRO-RESONANT SYSTEMS

Kenneth Frank Bacon, Southwick, England, assignor to North American Philips Company, Inc., New York, N.Y.

Filed Apr. 10, 1958, Ser. No. 727,619

8 Claims. (Cl. 324—70)

The present invention relates to systems for the accurate detection of mechanical motion involving the translation of relative physical movement between two or more parts into electrical changes.

Prior to this invention it has been known to measure movement in a frictionless manner by photoelectric means which have necessitated the use of a light source, scanning devices and photo-cells together with their associated amplification circuitry and power supplies. Such systems suffer from the disadvantage that they are complicated and are dependent on lamp life for their reliability.

The present invention provides an improved direction sensing means and a method of measuring the speed of rotating parts and is particularly useful in measuring and locating heads of machine tools and remotely performing angular measurements.

The present invention also provides a simple, inexpensive method and/or device for the measurement of motion and sensing of direction of two or more relatively movable parts wherein such motion is directly related to the rate of occurrence of electrical changes. Changes generated by the method in accordance with this invention display constant level and rise time characteristics down to zero motional speed and may be interpreted by use of external electronic devices such as counters.

According to one aspect of the present invention there is provided an apparatus for producing an electrical change the occurrence of which is related to the relative movement between a first part and a second part comprises means for producing one or more discrete magnetic fields which means are secured to one of said parts and adapted to influence a magnetic core secured to said second part, said core having a winding included in a ferro-resonant circuit, connected to a means for supplying alternating current said ferro-resonant circuit being capable of a transition through the resonant point initiated by said influence so as to produce said change.

According to a second aspect of the present invention there is provided a method of producing an electrical change the occurrence of which is related to the relative movement between a first and a second part which comprises securing to one of said parts one or more discrete magnetic fields, influencing a magnetic core of one or more inductors in a ferro-resonant circuit secured to said second part with said discrete magnetic field, feeding said ferro-resonant circuit with high frequency energy initiating with aid of said influence a transition through the resonant point which transition produces an electrical change.

According to a further aspect of the present invention there is provided an apparatus for producing an electrical change the occurrence of which is related to the relative movement between a first part and a second part comprises means for producing one or more discrete magnetic fields which means are secured to one of said parts and adapted to influence a pair of magnetic cores secured to said second part each of said cores having a winding included in a separate series ferro-resonant circuit said separate circuits being parallel to one another and connected to a means for supplying alternating current by way of a current limiting means so that only one of said ferro-resonant circuits is capable of being resonant at a time, an electrical change in each of said circuits resulting from the transition of one said circuit through the resonant point, said transition being initiated by said influence, and the electrical change being in the form of a change in the alternating voltage present across either the inductance or capacitor of the circuit.

In order that this invention will be clearly understood it will now be described in detail with reference to the accompanying diagrammatic drawings in which:

Figure 1 is a basic circuit diagram of a bi-stable ferro-resonant circuit,

Figure 2 is a detail of an embodiment of this invention for the measurement and sensing of rotational movement, Figure 3 shows a complete circuit diagram of an apparatus for measuring and sensing rotational movement, Figures 4 and 5 are graphs showing typical output wave forms obtained from a circuit as shown in Figure 3 when used in conjunction with the embodiment shown in Figure 2.

The bi-stable ferro-resonant circuit shown in Figure 1 comprises two series tuned circuits L1, C1 and L2, C2 which are connected in parallel across a source of alternating current at points O—AC via a capacitor C3. The inductances L1 and L2 are wound on magnetic cores which exhibit decreasing effective permeability with increase flux.

If, in a resonant circuit having a sufficient low loss, the inductor being non-linear, and by reason of its non-linearity the circuit has two stable states when connected to an alternating current supply of suitable voltage and frequency, that circuit is said to be ferro-resonant.

For example, if the voltage applied to a series ferro-resonant circuit is gradually increased until the current in the inductor is sufficient to cause a decrease in inductance, the circuit impedance will decrease causing a cumulative increase in current so that the current suddenly increases to a relative high value, the core is now operating into saturation, and the circuit is approximately resonant.

The capacitor C3 is chosen to have a reactance on and around the resonant point of the tuned circuits L, C1 and L2, C2 in order to limit the supply of alternating current and ensure that only one of each series tuned circuits can be in resonance at a time so that the voltage drop caused by the reactance of C3 is such as to leave one of the series circuits non-resonant whilst the other is in resonance. If a source of alternating current for example 200 kc./s. having a value of about 10 volts is applied across the terminals O—AC, each of the series tuned circuits may be triggered into resonance by momentary influencing the core of its inductance with an external magnetic field.

Figure 2 shows part of a wheel 2 having displaced around its periphery a number of equally spaced permanent magnets 4, 5, 6 and 7 of circular cross section. The wheel 2 is arranged to rotate at speed and direction which is desired to be measured and sensed. The two inductances L1 and L2 in circuit shown in Figure 1 are located so that lines of magnetic flux emanating from the magnets 4, 5, 6 and 7 may in turn influence the inductances L1 and L2. If the wheel is now rotating in the direction of the arrow 3 and taking the case as illustrated where the inductances L1 and L2 are in a mid position between the magnets 5 and 6, L2 has just been passed by the magnetic field of magnet 6 and remains resonant due to the relatively high current flowing through its series branch and L1 still remains non-resonant. Continued rotation of the wheel in the direction of the arrow 3 the magnet 5 next approaches L1 and due to the orientation of its magnetic field caused by the circular cross section of the magnet there is sufficient influence from the magnet 5 on L2 to prevent L1 from being triggered into resonance, consequently both tuned circuits try to reach resonance but are prevented by the voltage drop of C3 and both circuits reach an intermediate state. With further rotation of the wheel 2 the magnet 5 leaves L1 and influences L2 so that it is resonant again and triggers L1 from its intermediate stage into non-resonance. Continued rotation bringing about a further cycle of operations in which it will be noted that at no time does L1 reach resonance whilst the wheel 2 is rotating as indicated. Rotation of the wheel 2 in the opposite direction will bring about a reverse cycle of operations in which L1 changes from the intermediate stage to resonance and L2 from non-resonance to its intermediate stage.

In Figure 3 the basic bi-stable ferro-resonant circuit shown in Figure 1 has been elaborated to include the tapping of a potential difference across C1 and C2 of each circuit limb and provision being included for the rectification of said potential by means of rectifiers D1 and D2 with subsequent smoothing by resistor and capacitor networks C5, R1 and C4, R2. The demodulated output potential is then subjected to a limiting action by rectifiers D3 and D4. If terminal B is supplied with a positive terminal in respect to terminal O then any output obtained at terminal X and Y will never be allowed to exceed the potential applied at terminal B provision for a D.C. return path is effected by inclusion of a high frequency choke R.F.C. at the junction of L1, L2 and C3. Considering the case shown in Figure 2 wherein inductances L1 and L2 are connected in a circuit as shown in Figure 3 a source of high frequency energy for example 10 volts at a frequency of 200 kc./s. is applied to terminals AC—O, then providing there is no limiting action the output obtained at terminal X will be as is shown in Figure 4 where it is seen to vary from 1 to 5 volts i.e. variation of L1 from resonance to intermediate stage. Whereas in Figure 5 the demodulated output at Y is shown to vary from 5 to 8 volts i.e. the variation of L2 from its intermediate stage to resonance. If a limiting voltage is now applied to terminal B in Figure 3 so as to limit all voltages exceeding 5 volts it will be seen that for rotation of the wheel 2 in Figure 2 in the direction of the arrow 3 i.e. clockwise, output pulses will only be obtained at the terminal Y in Figure 3 and for anti-clockwise rotation output pulses will only be obtained at terminal X thus providing a sense of direction.

Speed of rotation may be obtained by use of a suitable counter for comparing the pulse repetition rate against a standard pulse source. It will be readily appreciated that an increase in accuracy will be obtained with a greater number of integral magnetic influences but since the pulse rise time is dependent on the bi-stable action of the ferro-resonant circuit and on the frequency of the alternating current supply this rise time will remain constant for speeds down to zero. The frequency of the alternating current supplied to it must be arranged to be so high in comparison with repetition rate that it will have no significant influence on the accuracy of the system.

What I claim is:

1. Electrical apparatus comprising input means for an alternating voltage of given frequency, a first circuit arrangement comprising inductance and capacitance, said inductance undergoing variations in value upon changes in the magnetic flux thereof and at a given flux exhibiting a value producing electrical resonance with said capacitance at said given frequency, a second circuit arrangement comprising inductance and capacitance, said second inductance undergoing variations in value upon changes in the magnetic flux thereof and at a given flux exhibiting a value producing electrical resonance with said second capacitance at said given frequency, means responsive to current flow through one of said circuits for limiting current flow through the other of said circuits, and means for selectively varying the flux of the inductance of one of said circuits thereby to produce resonance in said circuit and to limit current flow in the other of said circuits.

2. Electrical apparatus comprising input means for an alternating voltage of given frequency, a first circuit arrangement comprising an inductor and a capacitor, said inductor comprising a core member undergoing variations in permeability upon changes in the magnetic flux therein and at a given flux imparting to said inductor a value producing electrical resonance with said capacitor at said given frequency, a second circuit arrangement comprising an inductor and a capacitor, said second inductor comprising a core member undergoing variations in permeability upon changes in the magnetic flux therein and at a given flux imparting to said inductor a value producing electrical resonance with said second capacitor at said given frequency, means coupled to said circuit arrangements responsive to current flow through one of said circuits for limiting current flow through the other of said circuits, and means for selectively varying the flux of the core of the inductor of one of said circuits thereby to produce resonance in said circuit and to limit the current flow in the other of said circuits.

3. Electrical apparatus comprising input means for an alternating voltage of given frequency, a first circuit arrangement comprising an inductor and a capacitor, said inductor comprising a core member undergoing a decrease in permeability to a saturation condition upon an increase in current through said inductor, said core at said condition imparting to said inductance a value producing electrical resonance with said capacitor at said given frequency, a second circuit arrangement comprising an inductor and a capacitor, said second inductor comprising a core member undergoing a decrease in permeability to a saturation condition upon an increase in current through said inductor, said second core at said condition imparting to said inductance a value producing electrical resonance with said second capacitor at said given frequency, means coupled to said circuit arrangements responsive to current flow through one of said circuits for limiting current flow through the other of said circuits, and means for selectively varying the flux of the core of the inductor of one of said circuits thereby to produce resonance in said circuit and to limit the current flow in the other of said circuits.

4. Electrical apparatus comprising input means for an alternating voltage of given frequency, a first circuit arrangement comprising an inductor and a capacitor connected in series, said inductor comprising a core member undergoing variations in permeability upon changes in the magnetic flux therein and at a given flux imparting to said inductor a value producing electrical resonance with said capacitor at said given frequency, a second circuit arrangement connected in parallel with said first circuit arrangement and comprising an inductor and a capacitor connected in series, said second inductor comprising a core member undergoing variations in permeability upon changes in the magnetic flux therein and at a given flux imparting to said inductor a value producing electrical resonance with said second capacitor at said given frequency, impedance means interconnecting said input means and said circuit arrangements, and means for selectively varying the flux of the core of the inductor of one of said circuits thereby to produce resonance in said circuit and to limit the current flow in the other of said circuits.

5. Electrical apparatus comprising input means for an alternating voltage of given frequency, a first circuit arrangement comprising an inductor and a capacitor, said inductor comprising a core member undergoing a decrease in permeability to a saturation condition upon an increase in current through said inductor, said core at said condition imparting to said inductor a value producing electrical resonance with said capacitor at said given frequency, a second circuit arrangement comprising an inductor and a capacitor, said second inductor comprising a core member undergoing a decrease in permeability to a saturation condition upon an increase in current through said inductor, said core at said condition imparting to said inductor a value producing electrical resonance with said second capacitor at said given frequency, means coupled to said circuit arrangements responsive to current flow through one of said circuits for limiting current flow through the other of said circuits, and means for selectively varying the flux of the core of the inductor of one of said circuits thereby to produce resonance in said circuit and to limit the current flow in the other of said circuits, said latter means comprising a source of an external magnetic field and means for varying the position of said source relative to one of said inductors.

6. Electrical apparatus comprising input means for an alternating voltage of given frequency, a first circuit arrangement comprising an inductor and a capacitor connected in series, said inductor comprising a core member undergoing a decrease in permeability to a saturation condition upon an increase in current through said inductor, said core at said condition imparting to said inductor a value producing electrical resonance with said capacitor at said given frequency, a second circuit arrangement connected in parallel with said first circuit and comprising an inductor and a capacitor connected in series, said second inductor comprising a core member undergoing a decrease in permeability to a saturation condition upon an increase in current through said inductor, said core at said condition imparting to said inductor a value producing electrical resonance with said second capacitor at said given frequency, means coupled to said circuit arrangements responsive to current flow through one of said circuits for limiting current flow through the other of said circuits, means for selectively varying the flux of the core of the inductor of one of said circuits thereby to produce resonance in said circuit and to limit the current flow in the other of said circuits, rectifier means connected to said first circuit for producing a first output potential having a value determined by the intensity of current flow through said first circuit, and rectifier means connected to said second circuit for producing a second output potential having a value determined by the intensity of current flow through said second circuit.

7. Electrical apparatus comprising input means for an alternating voltage of given frequency, a first circuit arrangement comprising an inductor and a capacitor connected in series, said inductor comprising a core member undergoing a decrease in permeability to a saturation condition upon an increase in current through said inductor, said core at said condition imparting to said inductor a value producing electrical resonance with said capacitor at said given frequency, a second circuit arrangement connected in parallel with said first circuit and comprising an inductor and a capacitor connected in series, said second inductor comprising a core member undergoing a decrease in permeability to a saturation condition upon an increase in current through said inductor, said core at said condition imparting to said inductor a value producing electrical resonance with said second capacitor at said given frequency, impedance means interconnecting said input means and said circuit arrangements, said impedance means upon current flow at resonance through one of said circuits limiting current flow through the other of said circuits, and means comprising a plurality of magnets having a circular cross section mounted in movable relationship to said inductors for selectively varying the flux of the core of the inductor of one of said circuits thereby to produce resonance in said circuit and to limit the current flow in the other of said circuits.

8. Electrical apparatus as claimed in claim 7, further comprising first and second rectifier means connected respectively to said first and second circuits thereby to produce first and second output voltages as determined by the intensity of current flow in said circuits, and means for applying a biasing potential to said rectifier means.

References Cited in the file of this patent

UNITED STATES PATENTS

| | | |
|---|---|---|
| 2,503,155 | Harvey | Apr. 4, 1950 |
| 2,731,599 | Groeper | Jan. 17, 1956 |
| 2,841,760 | Hansen | July 1, 1958 |